(12) United States Patent
Heel et al.

(10) Patent No.: US 12,304,144 B2
(45) Date of Patent: *May 20, 2025

(54) APPARATUS AND METHOD FOR PRODUCING THREE-DIMENSIONAL OBJECTS

(71) Applicant: Q.big 3D GmbH, Aalen (DE)

(72) Inventors: Michael Heel, Aalen (DE); Dennis Herrmann, Weinstadt (DE); Katja Schlichting, Birkenfeld (DE)

(73) Assignee: Q.BIG 3D GMBH, Aalen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/973,853

(22) PCT Filed: Jun. 6, 2019

(86) PCT No.: PCT/EP2019/064848
§ 371 (c)(1),
(2) Date: Dec. 10, 2020

(87) PCT Pub. No.: WO2019/238533
PCT Pub. Date: Dec. 19, 2019

(65) Prior Publication Data
US 2021/0178676 A1    Jun. 17, 2021

(30) Foreign Application Priority Data

Jun. 12, 2018 (DE) ................ 10 2018 114 008 8

(51) Int. Cl.
*B29C 64/209* (2017.01)
*B29C 64/118* (2017.01)
(Continued)

(52) U.S. Cl.
CPC ......... *B29C 64/209* (2017.08); *B29C 64/118* (2017.08); *B29C 64/336* (2017.08); *B33Y 10/00* (2014.12); *B33Y 30/00* (2014.12)

(58) Field of Classification Search
CPC ..... B29C 64/209; B29C 64/106; B29C 64/00; B29C 64/336; B29C 64/118; B33Y 30/00; B33Y 10/00
See application file for complete search history.

(56) References Cited

U.S. PATENT DOCUMENTS 4,190,409 A * 2/1980 Hehl .................. B29C 45/1634
366/156.1
8,105,064 B2 * 1/2012 Nozawa ............. B29C 48/2556
425/133.5
(Continued)

FOREIGN PATENT DOCUMENTS

CN    107521103 A    12/2017
CN    106738863 B *   3/2019
(Continued)

OTHER PUBLICATIONS

International Search Report and Written Opinion for International Application No. PCT/EP2019/064848, mailed Sep. 20, 2019 (17 pages).

*Primary Examiner* — Farah Taufiq
(74) *Attorney, Agent, or Firm* — Clark & Elbing LLP (57) ABSTRACT

An apparatus (1) for producing three-dimensional objects (2) from a deformable material (4) has the following features:
  a housing (3) that has a chamber (21) for receiving the deformable material (4);
  a feed device (5) for feeding the deformable material (4) into the chamber (21) of the housing (3);
  a first discharge opening (7) for discharging the deformable material (4) from the chamber (21) of the housing (3);
  a first closing device (8) for selectively closing and opening the first discharge opening (7), said device (8)
(Continued)

having a cavity (22) connected via at least one connecting bore (23) to the chamber (21) of the housing (3);

a second discharge opening (11) which has a smaller cross-section than the first discharge opening (7), for discharging the deformable material (4) from the cavity (22) of the first closing device (8), and a second closing device (24) for selectively closing and opening the connecting bore (23).

16 Claims, 7 Drawing Sheets

(51) Int. Cl.
*B29C 64/336* (2017.01)
*B33Y 10/00* (2015.01)
*B33Y 30/00* (2015.01)

(56) References Cited

U.S. PATENT DOCUMENTS

| | | | | |
|---|---|---|---|---|
| 2016/0303802 A1* | 10/2016 | Meshorer | ................ | B29C 48/05 |
| 2019/0283320 A1* | 9/2019 | Mizukami | ............. | B29C 64/106 |
| 2021/0146430 A1* | 5/2021 | Schaeuffele | ............ | B22F 3/115 |

FOREIGN PATENT DOCUMENTS

| | | | |
|---|---|---|---|
| EP | 0040068 A1 * | 11/1981 | |
| EP | 3081364 A1 | 10/2016 | |

\* cited by examiner

APPARATUS AND METHOD FOR PRODUCING THREE-DIMENSIONAL OBJECTS

The invention relates to an apparatus and a method for producing three-dimensional objects from a deformable material.

An apparatus for producing three-dimensional objects from a deformable material is known from U.S. Pat. No. 9,821,905 B2.

WO 2014/153535 A2 discloses a printer for three-dimensional objects in which a thread-like stiffening material, for example, is discharged with the actual printing material.

U.S. Pat. No. 5,936,816 describes an apparatus and a method for producing three-dimensional objects from a deformable material, wherein a reinforcing fiber is discharged with the deformable material.

U.S. Pat. No. 6,899,777 B2 describes a continuous extrusion process in which a ceramic, metal or plastic fiber is extruded together with a thermoplastic elastomer.

EP 2 676 784 A1 describes a method for producing an object by extrusion. In the method, a filament is fed to an extrusion head and discharged from it together with a matrix material.

US 2014/0232035 A1 describes an apparatus for producing objects by extrusion, which has an extrusion needle for extruding thermoplastic material together with several fiber strands.

U.S. Pat. No. 9,511,543 B2 discloses a method and an apparatus for the additive production of three-dimensional objects. Several materials are extruded simultaneously as one composite material. In this case, at least one material is present in liquid form and at least one material is present in solid form.

DE 10 2011 050 780 A1 describes a method and an apparatus for applying a continuous fiber to an object. This is done by an application nozzle to which a continuous filament and an impregnating material are fed.

However, the known solutions are relatively inflexible and can therefore generally be used only to a very limited extent.

Therefore, it is an object of the present invention to provide an apparatus and a method for producing three-dimensional objects from a deformable material allowing a more flexible application.

According to the invention, this object is achieved by the features mentioned in claim 1.

With the apparatus according to the invention, it is possible to discharge different quantities of the deformable material due to the two discharge openings, which have different cross-sections. Each discharge opening can be closed or opened independently of the other, so that either a small amount of the deformable material can be discharged to the second discharge opening with a smaller cross-section or a larger amount of the deformable material can be discharged to the first discharge opening with a larger cross-section. Furthermore, it is possible to completely close the apparatus according to the invention so that no material can escape from it. This is particularly advantageous if the apparatus is to be moved between two points without discharging deformable material.

Due to this design, the apparatus according to the invention can be used very flexibly, since it is always possible—in contrast to known solutions—to discharge the desired amount of deformable material. When using the second discharge opening with the smaller cross-section, very fine surfaces can be produced, whereas when using the first discharge opening with the larger cross-section, it is possible to apply very large quantities of the deformable material and thus produce very large structures in a relatively short time.

In a very advantageous further embodiment of the invention, it may be envisaged that the second closing device is arranged within the cavity of the first closing device. This results in a very compact construction of the apparatus according to the invention.

In a further advantageous embodiment of the invention, if the first closing device for selectively closing and opening the first discharge opening is adjustable in its longitudinal direction by means of an adjusting arrangement, very fast closing or opening of the first discharge opening is possible on the one hand. On the other hand, the cross-section of the first discharge opening can thereby be adjusted continuously in principle, as it is possible to position the first closing device in any position between complete opening and complete closing of the first discharge opening. Furthermore, such a solution allows a relatively simple design of the drive of the adjusting arrangement for adjusting the closing device, which can be provided so as to require little installation space.

Another advantageous embodiment of the invention may consist in that the second closing device for selectively closing and opening the connecting bore is adjustable in its longitudinal direction by means of an adjusting arrangement. If the second closing device is also adjustable in its longitudinal direction, similar advantages result as with the adjustment of the first closing device in its longitudinal direction. Furthermore, the connecting bore extending through the first closing device, which connects the cavity leading to the second discharge opening with the chamber of the housing, can be closed and opened very easily in this way. The adjusting arrangement used to adjust the second closing device may be the same adjusting arrangement that is used to adjust the first closing device.

As an alternative to the adjustment of the second closing device in its longitudinal direction, it is also possible that the second closing device can be rotated around its longitudinal axis by means of an adjusting arrangement for selectively closing and opening the connecting bore. The connecting bore can also be closed or opened in this way.

If, in a further advantageous embodiment of the invention, the adjusting arrangement comprises a control sleeve with at least one groove in which at least one pin connected to one of the closing devices engages, the control sleeve and the at least one closing device being rotatable relative to one another, a reliable possibility for actuating at least one of the closing devices results. In the case that both the first and the second closing device are adjustable in their longitudinal direction by means of the adjusting arrangement, the control sleeve may have separate grooves for both closing devices, which may have a similar design. However, the control sleeve can also be used to rotate the second closing device about its longitudinal axis.

A simple and reliable relative movement between the control sleeve and the at least one closing device results if the control sleeve and/or the at least one closing device can be rotated by means of a drive device which is operatively connected to the control sleeve and/or the at least one closing device via a transmission arrangement.

In another advantageous embodiment of the invention, the transmission arrangement may be a gear drive or belt drive. The control sleeve or at least one of the closing devices can be driven very easily by means of the drive device, for example by means of an electric motor, both by means of a belt drive and by means of a gear drive, whereby a particular advantage of a belt drive or a gear drive can be seen in its insensitivity to high temperatures.

Another advantageous embodiment of the invention may consist in that at least one of the closing devices is held in a non-rotatable manner. This prevents unwanted rotational movements of the at least one closing device, thus ensuring reliable operation of the apparatus.

A solution based on a method is evident from the features of claim 10.

The method according to the invention, wherein the step of discharging the deformable material from the second discharge opening having a smaller cross-section is performed before the step of discharging the deformable material from the first discharge opening having a larger cross-section, makes it possible to expand or stiffen a structure previously formed by material discharged from the second discharge opening so that a high surface quality is present on the outer periphery of an object formed by the method according to the invention by the comparatively thin strands of the deformable material discharged from the second discharge opening, whereas the larger cross-section of the first discharge opening allows a large quantity of the deformable material to be discharged in a very short time, so that larger components can also be produced in a comparatively short time.

In particular, by discharging the deformable material from the first, larger discharge opening, an inner, stiffening area of the object to be produced, also known as infill, can be formed. In principle, the deformable material discharged from the second discharge opening forms a framework which is stiffened by the deformable material discharged from the first discharge opening.

The deformable material discharged from the first discharge opening can be introduced into the previously formed framework in the manner of a lattice structure, which leads to better stiffening of the object produced by the method according to the invention. Accordingly, this saves a considerable amount of time compared to known methods. The method according to the invention is particularly, but not exclusively, suitable for thin-walled components which have an internal volume formed by the deformable material discharged from the first discharge opening.

This also exploits the effect that the strands of the deformable material with a larger cross-section do not negatively affect the fine surface of the border formed from the strands of the deformable material with a smaller cross-section, but instead lie against the inside of the structure formed first.

Embodiment examples of the invention are schematically represented below with reference to the drawings.

Figure 1:
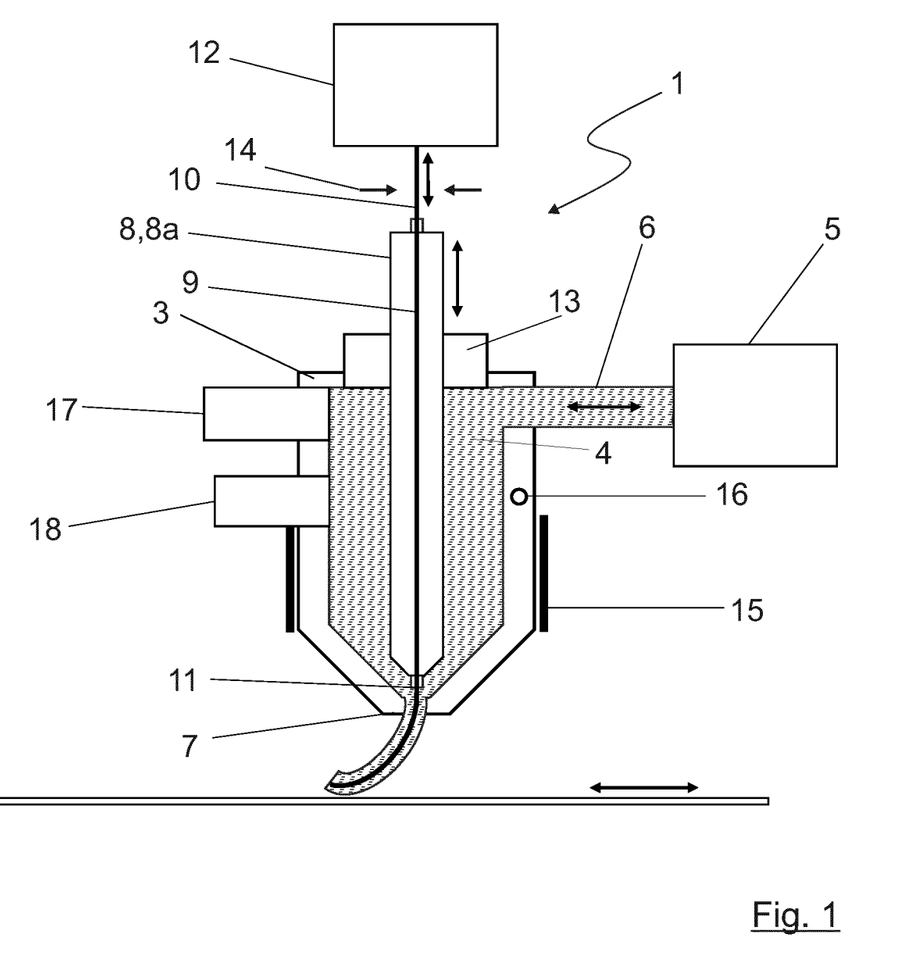
FIG. 1 shows an apparatus for producing three-dimensional objects from a deformable material.
Figure 8:
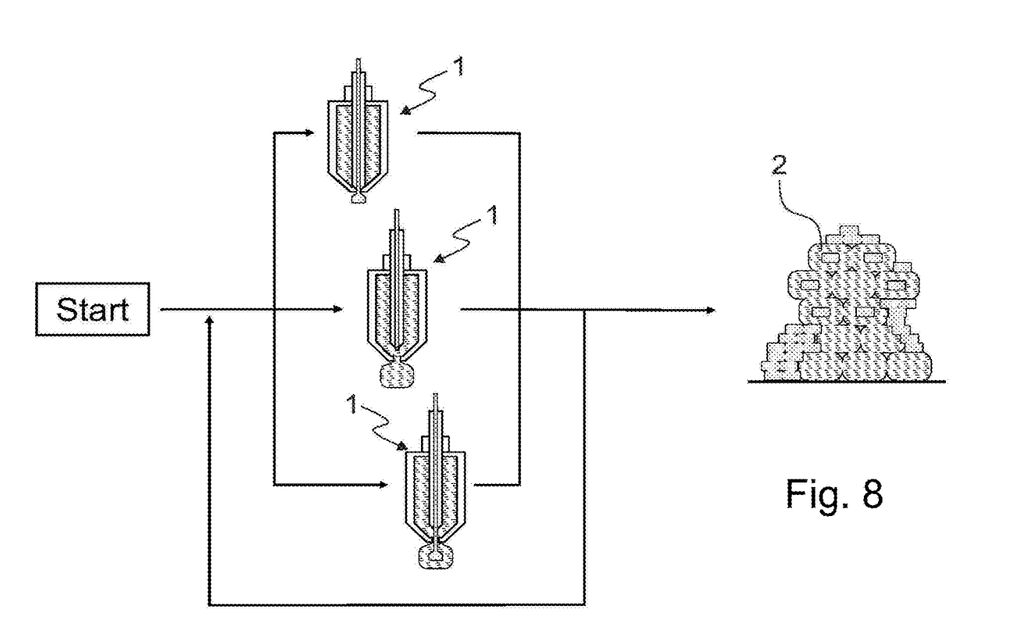
FIG. 8 shows three modes for performing the method for producing three-dimensional objects from a deformable material.

FIG. 1 shows an apparatus 1 for producing three-dimensional objects 2. An exemplary three-dimensional object 2 is shown in FIG. 8 in different modes of a method for producing the three-dimensional object 2.

The apparatus 1 comprises a housing 3, which serves to receive a deformable material 4, from which, among other things, the three-dimensional object 2 can be produced. To feed the deformable material 4 to the housing 3 a feed device 5 is used, which may comprise, for example, an extruder not shown. The feed device 5 also comprises a feed line 6 which leads directly to the housing 3 and feeds the deformable material 4 to the housing 3. For example, the deformable material 4 in the feed device 5 can be in the form of a solid granulate. In a manner not shown, the extruder can be connected to the print head or the housing 3 by means of a movable or flexible connecting hose, which may be designed in particular as a heating hose, in order to compensate for movements between these two elements. This results in a lower mass to be moved at the print head.

The deformable material 4 is discharged from the housing 3 through a first discharge opening 7, which in this case is located at the bottom of the housing 3. Furthermore, the apparatus 1 comprises a closing device 8 which serves to selectively close and open the first discharge opening 7 and which in the present case is designed in such a way that the cross-section of the first discharge opening 7 can be changed by means of the closing device 8 at least in several steps, in particular continuously. The variable cross-section of the first discharge opening 7 allows the web width and height of the individual layers of the deformable material 4 to be changed during printing. For example, the extrusion volume of the deformable material 4 discharged from the first discharge opening 7 can be up to 2 $cm^3$ per second, which is much higher than in known solutions, so that the three-dimensional object 2 can be produced in much less time. The above-mentioned extrusion volume is only an example. The apparatus 1 can be used for extremely small applications, e.g. at cellular level, as well as for extremely large applications, e.g. at ship or house building level, and for any applications in between. The size and of the apparatus and the possible extrusion volume are therefore correspondingly dimensioned. The first discharge opening 7 can have a round, oval, rectangular, polygonal or similar shape. In particular, free-form surfaces or shapes without any symmetry are also possible.

The area where the first discharge opening 7 is located may be a regular pyramid shape, for example with three or more corners, a cone or truncated cone, a hemisphere or a spherical tip. Irregular shapes of this area are also possible.

In the present case, the closing device 8 is a needle 8a, which not only forms the closing device 8, but also has a bore 9 extending through it in a longitudinal direction and through which the deformable material 4 or an additional material 10 can be passed. Preferably, the bore 9 has an inner diameter which substantially corresponds to the outer diameter of the additional material 10 or may be slightly larger. The bore 9 thus allows the additional material 10 to be embedded in the printing process. If the needle 8*a* forms the closing device 8, this enables the formation of a very compact apparatus 1, since in this case the needle 8*a* is not only used for discharging the additional material 10, but also for closing the first discharge opening 7, through which the deformable material 2 is discharged, thus eliminating the need for a large number of components.

The bore 9 inside the needle 8*a* can be concentric or non-concentric, i.e. off-center, inside the needle 8*a*. There may also be two or more bores 9, which can be arranged regularly or irregularly relative to each other. If several of the bores 9 are provided, several additional materials 10, which may optionally be different, can also be discharged through the second discharge opening 11. Furthermore, the bore 9 may be split in the longitudinal direction x or two or more bores may converge.

In the lower part of the needle 8*a* there is a second discharge opening 11, which serves to discharge the additional material 10 from the needle 8*a*. The additional material 10 is fed into the bore 9 of the needle 8*a* by means of a second feed device 12, which in this case is located above the needle 8*a*.

The second feed device 12 for the additional material 10 may comprise a suitable drive device, for example one or more piezo elements, a stepper motor or the like. For example, the second feed device 12 may have two counter-rotating rollers, with the additional material 10 lying between the rollers. Depending on the arrangement of the feed device 12, these rollers can push or pull the additional material 10 into the bore 9 of the needle 8*a*. The second feed device 12 can be located directly before the needle 8*a*, directly after the needle 8*a*, inside the needle 8*a* or elsewhere. Of course, the first feed device 5 could also be arranged differently with respect to the housing 3. For example, the additional material 10 may be in wound form on a coil or the like associated with the second feed device 12.

In the present case, the needle 8*a* is continuously movable in its longitudinal direction x in relation to the housing 3, whereby the flow rate or the discharge volume of the deformable material 4 through the first discharge opening 7 is continuously variable and very precise control of the quantity of the deformable material 4 discharged through the first discharge opening 7 is possible. A corresponding drive or shifting device for moving the needle 8*a* in the longitudinal direction x is not shown in the figures.

Of course, in addition or as an alternative to the needle 8*a*, other components can be used to change the cross-section of the first discharge opening 7. The cross-section of the first discharge opening 7 can also be changed, for example, by replacing the area in which the first discharge opening 7 is located. If necessary, a template with different hole diameters may be located in this area, or a turret design is possible that has several of the first discharge openings 7, each with a different cross-section. These holes or bores with different cross-sections forming the first discharge opening 7 can be arranged radially or linearly. Furthermore, in particular, continuously adjustable cross-sections of the first discharge opening 7 in the manner of an iris, a loop or spiral made of a temperature-resistant material, for example a metal band or thread, of Kapton, Kevlar or a high-temperature resistant silicone are possible. Another possibility is to create the constriction by radially arranged fingers, the distance between which is variable. Furthermore, it is possible to compress flexible material in the area of the first discharge opening 7, which is designed similar to the connection mechanism of a bicycle pump and consists, for example, of silicone or a metal with nano-size pores. It is also possible to combine all the above-mentioned designs.

Furthermore, the apparatus 1 has a very schematically shown pressure generating device 13, which serves to generate and control a pressure on the deformable material 4 located in the housing 3. The pressure generating device 13 can be designed in a similar manner as a spring, whose force acting on the deformable material 4 is adjustable, however. The pressure generating device 13 for generating and controlling a pressure on the deformable material 4 located in the housing 3 results in a uniform discharge of the deformable material.

The pressure generating device 13, which may also serve as a pressure reservoir, can be designed in many different ways. For example, it may be a mechanical pressure generating device 13 which may have one or more disk springs, spiral springs, wave springs, coil springs, volute springs, leaf springs, rubber dampers, rubber bands and any combination of the above elements. Furthermore, it may also be a pneumatic and/or hydraulic pressure generating device that works with positive or negative pressure, for example. An electromechanical design of the pressure generating device 13 is also conceivable. The pressure generating device 13 can also be included in the feed device 5, e.g. in the form of a mechanically rotating screw that controls the volume within the housing 3 by changing the rotation speed.

For example, the volume within the housing 3 can be measured by means of a distance meter working according to an optical measuring principle and/or with ultrasound or with a hydraulic or pneumatic pressure sensor. It is also possible to generate a control system that can be adapted to the respective principle of the pressure generating device 13 and/or the feed device 5. It can therefore work with the spring travel and an externally exerted pressure, a pneumatic or hydraulic pressure in a pressure chamber as well as an externally exerted pressure and/or a servomotor forming part of the pressure reservoir and an externally exerted pressure.

Furthermore, FIG. 1 very schematically shows a separating device 14 for separating the additional material 10. The separating device 14 may have one or more cutting edges, which may be flat, angular, scissor-shaped or round in the shape of a cigar cutter. The separating device 14 can be provided before the needle 8*a*, after the needle 8*a* or in the needle 8*a*. There may be one or more fixed cutting edges and one or more cutting edges moving relative to one another. Furthermore, two or more cutting edges moving relative to one another may be provided, such movement also being possible in two axes with respect to each other. Combinations of these are also conceivable. Separation of the additional material 10 by means of the separating device 14 is particularly useful or appropriate when switching from one of the modes described below for operating the apparatus 1 to another mode or when changing the position of the apparatus 1. The separating device 14 can be controlled in such a way that the additional material 10 is fed or no longer fed during a subsequent mode change. The separating device 14 for separating the additional material 10 ensures flexible working when using the additional material 10.

Generally, the additional material 10 can assume both technical and purely optical tasks. The additional material 10 is preferably a stiffening material, such as a thread of a strong or high-strength material, such as aramid, carbon, Kevlar or the like. The additional material 10 can also be made of a wide variety of materials, such as natural fibers, e.g. wood, stone dust, hemp fibers, cotton or the like; synthetic fibers, plastic filaments, glass fibers, electrical conductor materials, hoses, cannulas, organic or artificial fabrics, chemical or organic liquids, such as adhesives, and gases in any form. However, it is also possible to use a resin as the additional material 10.

The additional material 10 preferably in the form of a fiber may be twisted, loose, fragmented or braided. It may be in the form of short, long and continuous fibers. The fiber can have a pre-embossed shape and can be spiral or folded, for example. Such a fiber can also be pre-treated, for example by soaking it in a liquid that hardens due to certain environmental influences. The liquid can also harden within the needle 8a or when leaving it. The fiber can be fused or sheathed with a matrix material. It is also possible to paint, polish, statically charge or compress the fiber which forms the additional material 10.

In one embodiment, the additional material 10 could have a sheath of a flexible material, with the core of the thread located inside the sheath providing increased tensile strength even if the material of the sheath is damaged. Furthermore, the fiber or thread can limit the elongation of the flexible material of the sheath. In this context, a separate sheathing system for the fiber forming the additional material 10 is also conceivable. This system can be arranged immediately before the feed of the additional material 10 into the needle 8a, or it can be placed elsewhere.

It is also possible to select the additive material 10 so that a chemical reaction with the deformable material 4 results to change the state of the deformable material 4 and/or of the additional material 10.

The deformable material 4 may be any type of liquid that solidifies after exiting the first discharge opening 7 due to the temperature difference from the ambient temperature. Also, photochemical solidification or curing of the deformable material 4, for example by irradiation with certain light sources or, if necessary, by ambient light is possible. Chemical curing or solidification is also possible through the reaction of two components that are located in the deformable material 4 or form the deformable material 4. The deformable material 4 may also be a two-component material that cures under certain conditions. It is also conceivable that the deformable material can be cured by means of radiation at specific wavelengths, e.g. UV radiation.

Furthermore, a temperature control unit 15 is arranged around the housing 3, allowing the deformable material 4 to be heated and/or cooled. In the present case, the temperature control unit 15 is connected to a temperature sensor 16, which serves to measure a temperature of the deformable material 4. The housing 3 can be provided with further temperature control devices, especially heating devices, in the area of the first discharge opening 7.

In addition, a feedback valve 17, which serves to return unneeded deformable material 4, and a pressure sensor 18, which is part of the pressure generating device 13 and facilitates the control or regulation of the pressure on the deformable material 4 located in the housing 3, are arranged at the housing 3.

The feedback valve 17, which forms part of a recirculation system for the deformable material 4, may be designed as a pressure relief valve to prevent damage to the entire apparatus 1 and in particular to the print head comprising the first discharge opening 7 and the second discharge opening 11. For example, it could be a control valve with a recirculation channel, in which excess, deformable material is returned in liquid or solid form further up the process. However, a feedback line extending from the feedback valve 17 to the first feed device 5 is not shown in the figures.

Figures 2, 3, 4:
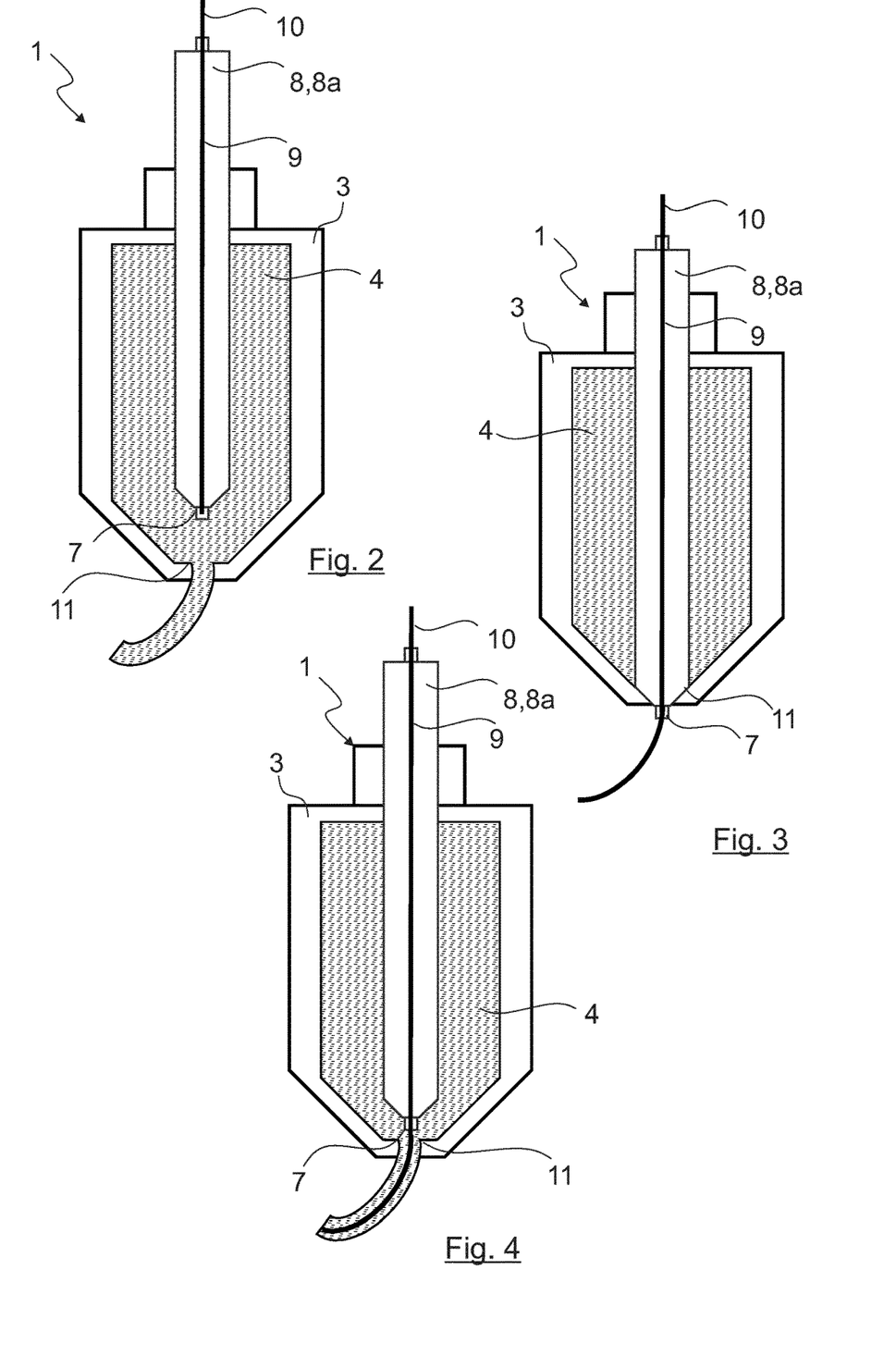
FIG. 2 shows the apparatus of FIG. 1 in a first configuration.
FIG. 3 shows the apparatus of FIG. 1 in a second configuration.
FIG. 4 shows the apparatus of FIG. 1 in a third configuration.

FIGS. 2, 3 and 4 show different configurations or positions that can be assumed by the apparatus 1 and methods that can be performed with the apparatus 1, which can also be described as different modes of the apparatus 1.

In the configuration according to FIG. 2, the closing device 8 is in such a position that the first discharge opening 7 is open and the deformable material 4 is discharged to it. In this configuration, no additional material 10 is fed through the second discharge opening 11. This can be achieved either by the second feed device 12 not conveying, or by the second discharge opening 11 being closed by a closing device not shown.

In the configuration of the apparatus 1 according to FIG. 3, however, the first discharge opening 7 is closed by means of the closing device 8 or the needle 8a, so that no deformable material 4 is discharged. However, by means of the second feed device 12 not shown in FIGS. 2 to 6, the additional material 10 is fed through the hole 9 of the needle 8a and discharged through the second discharge opening 11.

When the apparatus 1 is configured according to FIG. 4, the deformable material 4 is discharged through the at least partially opened first discharge opening 7 and the additional material 10 is discharged through the second discharge opening 11. Due to the arrangement shown of the needle 8a within the housing 3, the deformable material 4 surrounds the additional material 10.

Figure 5:
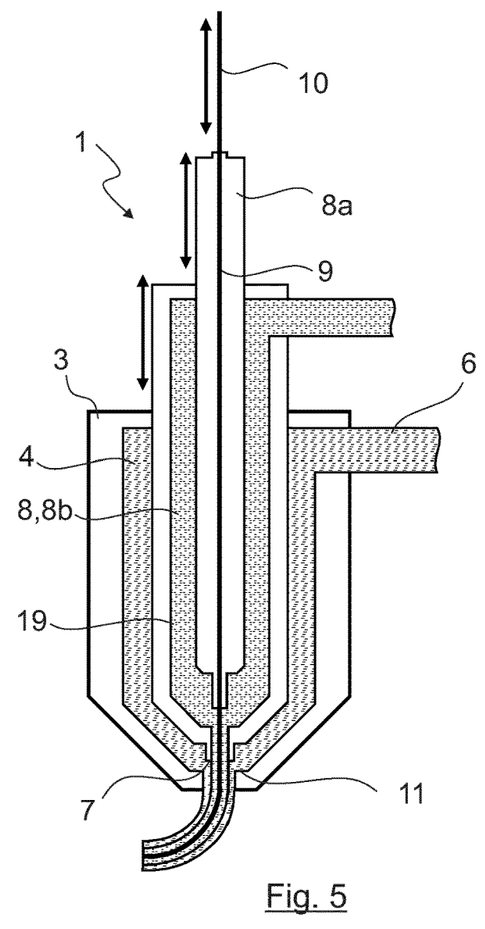
FIG. 5 shows a further embodiment of the apparatus for producing three-dimensional objects from a deformable material.
Figure 6:
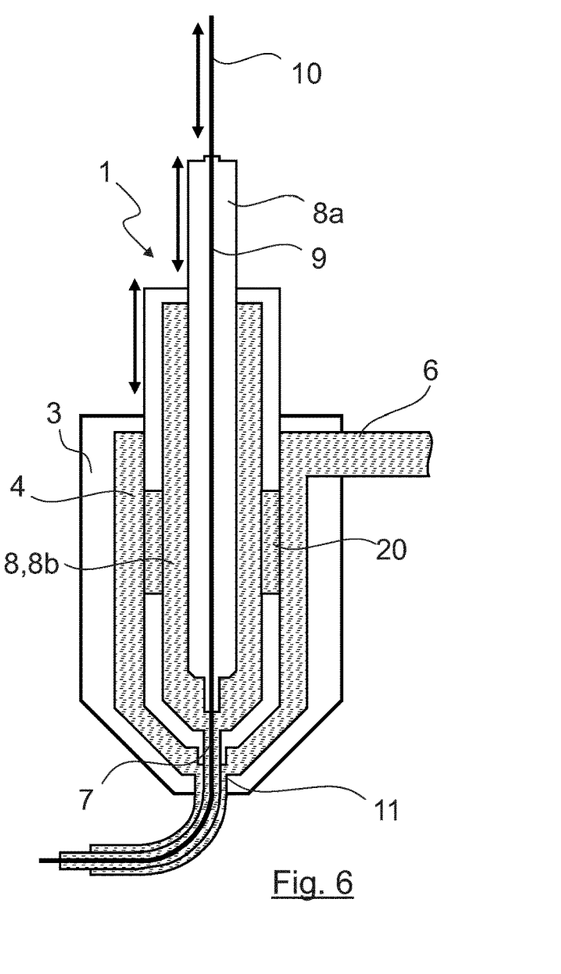
FIG. 6 shows the apparatus of FIG. 5 in another configuration.

FIGS. 5 and 6 show an alternative embodiment of the apparatus 1 in two different configurations or positions. As described in more detail below, in the configuration of the apparatus 1 according to FIG. 5, three materials are discharged, whereas in the configuration of the apparatus 1 according to FIG. 6 only one material is discharged.

In these embodiments, the diameter of the material dispensed through the first discharge opening 7 can also be changed gradually by arranging several of the needles, namely needle 8a as well as another needle 8b and, if necessary, further needles, which are not shown in FIGS. 5 and 6. This means that either the deformable material 4 can be discharged in different thicknesses, or different materials, namely a further deformable material 19, in addition to the deformable material 4, with in principle any number of sheaths, can be discharged, with the second needle 8b forming the wear device 8 in this case. The needles 8a, 8b and, if necessary, further needles can be moved individually in relation to each other and therefore any combination is possible regarding the discharge of the deformable material 4, the additional material 10 and the further deformable material 19.

Similar to the embodiment described above, the quantity of the discharged deformable material 4 and/or 19, i.e. its flow rate, can also be controlled here by the position of the needles 8a and 8b by placing the needles 8a and/or 8b in different positions in their longitudinal directions x.

If only one material is to be discharged in different thicknesses, the walls of the inner needle 8a can be open or, as shown in FIG. 6, contain holes or openings 20, allowing the deformable material 4 to flow into the needle 8a and/or 8b, as shown in FIG. 6.

The apparatus 1 described above can be used very flexibly with the two discharge openings 7 and 11, through which the deformable material 4 or the additional material 10 can be discharged. This makes it possible to discharge either only the deformable material 4, only the additional material 10, or the deformable material 4 and the additional material 10 simultaneously. In this way, the apparatus 1 can be used for a wide variety of tasks, including those which cannot be performed with known devices. This allows an extremely flexible use of the apparatus 1, so that it can be used very beneficially.

A particular advantage of the apparatus 1 is that the cross-section of the discharge opening 7 for the deformable material 4 can be changed by the closing device 8, thereby making it possible to change the quantity of material discharged within a specific time as well as the extrusion volume. This makes it possible, for example, to discharge large quantities of the deformable material 4 in order to produce relatively large objects 2 in a short time. In a possibly upstream step, finer surface structures can be generated. This is especially useful when details on the surface must be recognizable. Furthermore, this flexible use of the apparatus 1 makes it possible to produce objects 2 that require a higher surface quality.

Figure 7:
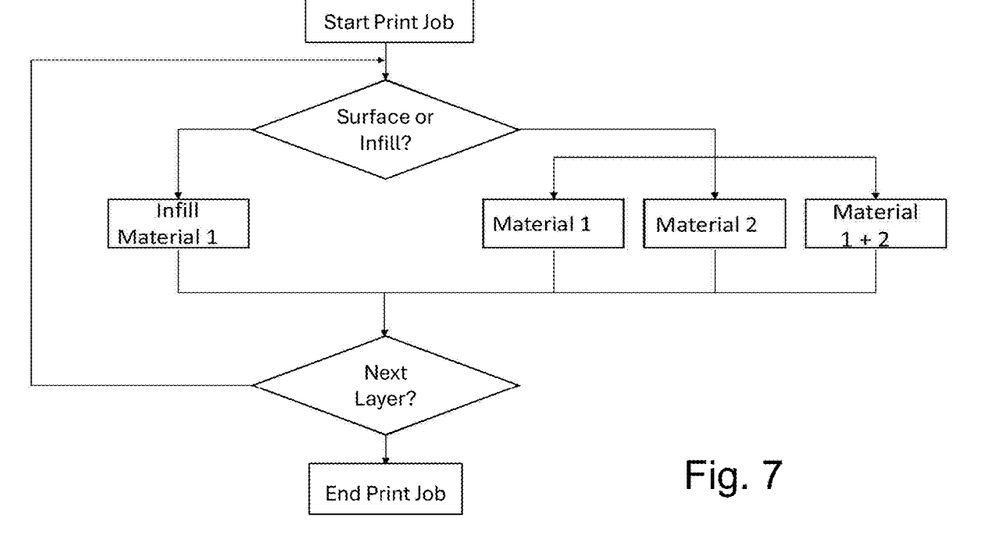
FIG. 7 shows an exemplary flow chart of a method for producing three-dimensional objects from a deformable material.

FIG. 7 shows an exemplary flow chart of a method for the production of the three-dimensional object 2, which is described in more detail below. Basically, in the method of producing the three-dimensional object 2 from the deformable material 4, the deformable material 4 is discharged from the first discharge opening 7 of the housing 3 and the additional material 10 is discharged from the second discharge opening 11 of the needle 8a. These two steps can be performed in different sequences, as described below. The process described below therefore provides for the discharge of both the deformable material 4 and the additional material 10, so that a wide variety of tasks with regard to the production of three-dimensional objects 2 can be processed extremely flexibly.

For example, in a first step the deformable material 4 and in a second step the additional material 10 can be discharged to smooth and/or stiffen a structure formed by the deformable material 4. In such a process, a comparatively large body or object can be formed in a relatively short time by means of the deformable material 4, which can then be expanded and/or smoothed and/or stiffened by the additional material 10 by means of smaller surface structures.

Furthermore, or alternatively, it could be envisaged that in a first step the additional material 10 is discharged and that in a second step the deformable material 4 is discharged in order to expand a structure formed by the additional material 10, for example to fill it. In this way, a rigid structure, e.g. a frame, can be created using the additional material 10, which can then be expanded, e.g. filled, in a subsequent step with the deformable material 4.

In order to be able to produce objects in a very short time and yet with a high surface quality, the deformable material 4 can be discharged in several steps in a further method. So, in a subsequent step, the first discharge opening 7 is opened with a considerably smaller cross-section than in a previous step. This is made possible by the closing device 8, which can be adjusted at least in several steps, especially in an infinitely variable manner.

FIG. 8 shows the three different modes for performing the method described above. As can be seen, all modes are selectable independently of the previous printing mode, with the three-dimensional object 2 on the right-hand side being only an example, of course. One of the results is that the surface resolution of the three-dimensional object 2 was smoothed by the striped, small structures compared to the coarse structure. It is also evident that the coarse structure, with or without a core, may also be present on the surface.

The entire apparatus 1 can be arranged on a motion system. This may be a multi-axis robot arm, a gantry system, one or more rotary joints, one or more linear drives, such as mechanical spindles, hydraulic or pneumatic cylinders, a toothed belt, a cable, electromagnetic direct drives or the like, a roller system, a mobile base, a mobile table with corresponding linear and/or rotary axes, or a combination of several systems. If necessary, the apparatus 1 can also be placed on a flying object, such as a drone.

FIGS. 9 to 14 show inventive embodiments of the apparatus 1 for producing three-dimensional objects 2 from the deformable material 4. The devices 1 described in FIGS. 9 to 14 are partly similar, but partly also different from the embodiments of the apparatus 1 shown in FIGS. 1 to 6. Therefore, all the features of the apparatuses 1 according to FIGS. 9 to 14 are described below. It is also possible to transfer certain features and properties of the apparatuses 1 shown in FIGS. 1 to 6 to the apparatuses 1 shown in FIGS. 9 to 14 and vice versa. In the following, identical components are identified by the reference numerals already used for the apparatuses 1 according to FIGS. 1 to 6.

The apparatus 1 has the housing 3, which has a chamber 21 for receiving the deformable material 4 not shown in FIGS. 9 to 14. The deformable material 4 is fed via the feed line 6 into the chamber 21 of the housing 3 by means of the feed device 5, which in this case is designed as an extruder. In the present case, the feed device 5 is designed in such a way that it assumes the function of the pressure generating device 13, so that the latter is not required. Although chamber 21 is not referenced in FIGS. 1 to 6, it is of course also present there. The temperature control unit 15, optionally comprising the temperature sensor 16, can also be provided, but is not shown in FIGS. 9 to 14.

The deformable material 4 can be discharged from the chamber 21 of the housing 3 via the first discharge opening 7, which is also present here. For selective closing and opening of the first discharge opening 7, the closing device 8 is also used here, which will be referred to as first closing device 8 in the following. The first closing device 8, similar to the closing device shown in FIGS. 1 to 6, is provided in the form of a needle. The first closing device 8 has a cavity 22 extending through it in the longitudinal direction x in the present case, said cavity 22 being connected via a connecting bore 23 to the chamber 21 of the housing 3, which chamber 21 is arranged annularly around the first closing device 8, and leading to the second discharge opening 11. In this design, the cavity 22 tapers in the direction of the second discharge opening 11 in a step that is located above the connecting bore 23. Such tapering is not absolutely necessary. The second discharge opening 11 is therefore a discharge opening provided in the first closing device 8, which serves to discharge the deformable material 4 from the cavity 22 of the first closing device 8. Accordingly, the deformable material 4 can be discharged alternatively to the first discharge opening 7 or the second discharge opening 11. Furthermore, it is possible to discharge the deformable material 4 to both the first discharge opening 7 and the second discharge opening 11. These different ways of configuring the apparatus 1 will be described in detail below. The second discharge opening 11 has a smaller cross-section than the first discharge opening 7. In this case, the connecting bore 23 extends perpendicular to the cavity 22, but this is not absolutely necessary.

The connecting bore 23 is similar to the holes or openings 20 in the walls of the inner needle 8a described above with reference to FIG. 6, or conversely, the function of the connecting bore 23 described here can be realized with the holes or openings 20 in the walls of the inner needle 8a. The connecting bore 23 can also be regarded as the second feed device 12 according to the embodiment example of FIG. 1. However, the connecting bore 23 does not discharge the additional material 10 but the deformable material 4.

The apparatus 1 also has a second closing device 24, which serves to selectively close and open the connecting bore 23 and is located within the cavity 22 of the first closing device 8. In this way, the supply of the deformable material 4 via the connecting bore 23 into the cavity 22 of the first closing device 8 can be interrupted so that the second discharge opening 11 can in principle be closed by means of the second closing device 24. Similar to the first closing device 8, the second closing device 24 is also in the form of a needle.

Figure 9:
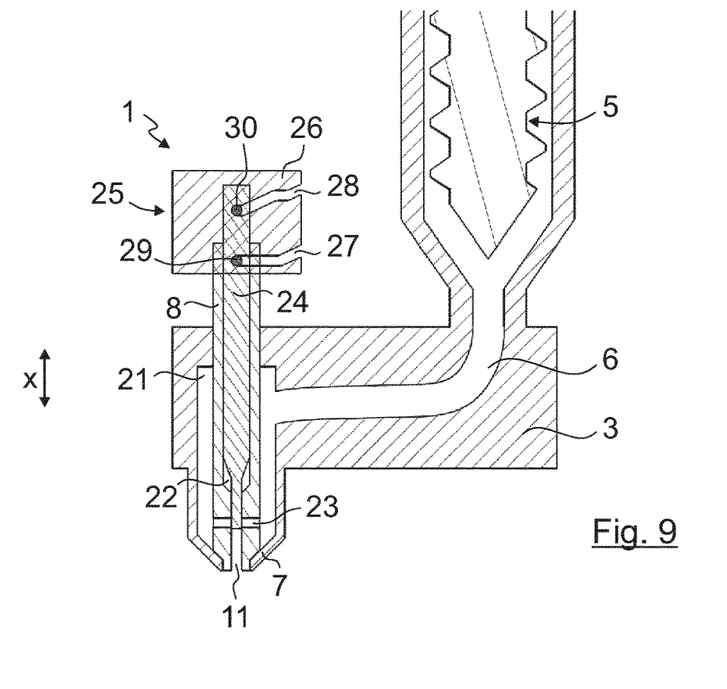
FIG. 9 shows a schematic view of an apparatus according to the invention in a first position.
Figure 10:
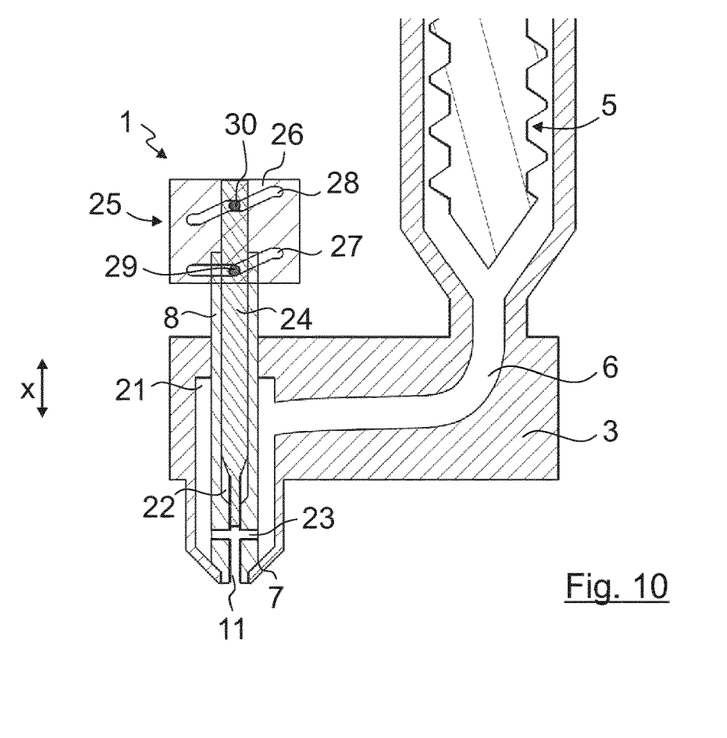
FIG. 10 shows the apparatus of FIG. 9 in a second position.
Figure 11:
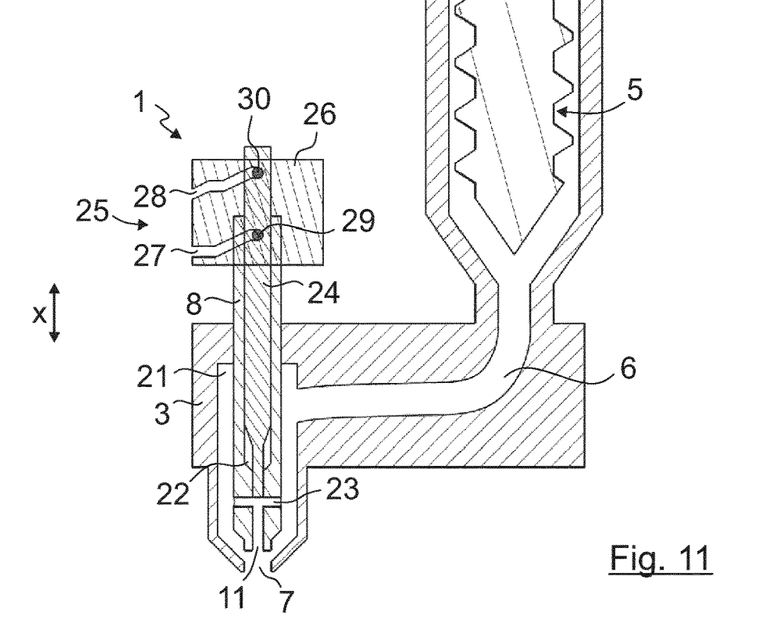
FIG. 11 shows the apparatus of FIG. 9 in a third position.

FIGS. 9, 10 and 11 show three different configurations or positions of the apparatus 1. In the configuration of FIG. 9, the first discharge opening 7 is closed by means of the first closing device 8. The second closing device 24 closes the connecting bore 23 and thus also the second discharge opening 11. In this configuration, therefore, no deformable material 4 can emerge from the apparatus 1.

In the configuration of FIG. 10, the first discharge opening 7 is closed by means of the first closing device 8 as shown in FIG. 9. In contrast, the connecting bore 23 is opened by the second closing device 24, so that the deformable material 4 is discharged via the chamber 21 and the connecting bore 23 to the second discharge opening 11. Since the second discharge opening 11 has a much smaller cross-section than the first discharge opening 7, the deformable material 4 discharged accordingly has a very small cross-section or is very thin.

When the apparatus 1 is configured according to FIG. 11, both the first discharge opening 7 and the connecting bore 23 are open. This allows the deformable material 4 to be discharged through the first discharge opening 7. The deformable material 4 can also be discharged through the connecting bore 23 to the second discharge opening 11. However, since the first discharge opening 7 is also released, this portion of the deformable material 4 is less relevant or not relevant.

Preferably a method for producing the three-dimensional objects 2 from the deformable material 4 is performed by means of the apparatus 1, said method comprising the following steps: a step of discharging the deformable material 4 from the first discharge opening 7 of the chamber 21 of the housing 3; a step of discharging the deformable material 4 from the second discharge opening 11 of the cavity 22, which has a smaller cross-section than the first discharge opening 7. The step of discharging the deformable material 4 from the second discharge opening 11 is performed before the step of discharging the deformable material 4 from the first discharge opening 7 of the housing 3 to expand and/or stiffen a structure formed by the deformable material 4 discharged from the second discharge opening 11 with the deformable material 4 discharged from the first discharge opening 7. Of course, the apparatus 1 also allows to produce a three-dimensional object 2 as often as desired and in a different sequence of process steps.

In the embodiment example of the apparatus 1 shown in FIGS. 9, 10 and 11, the two closing devices 8 and 24 are adjustable in their longitudinal direction referred to as "x" by means of an adjusting arrangement 25. For this purpose, the adjusting arrangement 25 in the embodiment example shown has a control sleeve 26, which is also shown in FIGS. 9, 10 and 11. The control sleeve 26 in turn has two grooves 27 and 28, one above the other in the present case, in which the respective pins 29 and 30 engage, which are each connected to one of the closing devices 8 or 24. Here, the control sleeve 26 and at least one of the closing devices 8 and/or 24, in the present case both closing devices 8 and 24, are rotatable relative to each other. In the embodiment example shown, the pin 29 connected to the first closing device 8 engages in the lower groove 27 of the control sleeve 26. The pin 30 connected to the second closing device 24 engages in the upper groove 28 of the control sleeve 26. By means of the control sleeve 26 and the pins 29 and 30 engaging in the grooves 27 and 28, the three positions of the two closing devices 8 and 24 shown in FIGS. 9, 10 and 11 can be adjusted by positively guiding the pins 29 and 30 in the grooves 27 and 28. This means that exactly one axial position of the closing devices 8 and 24 is assigned to each rotary position of the control sleeve 26. So, in the embodiment example shown, the two closing devices 8 and 24 are not only positively guided by means of the control sleeve 26 but also coupled to each other via the control sleeve 26.

The course of the two grooves 27 and 28 can best be seen in the position of the control sleeve 26 according to FIG. 10. This course of the grooves 27 and 28 ensures the described movement of the two closing devices 8 and 24. It can be seen that for the transition from the state shown in FIG. 9 to the state shown in FIG. 10, the groove 27 receiving the pin 29 connected to the first closing device 8 extends horizontally, which means that the first closing device 8 is not lifted when the control sleeve 26 rotates. Instead, only the second closing device 24 is raised, since the groove 28, which receives the pin 30 connected to the second closing device 24, is oblique. In the right-hand area of the control sleeve 26 shown in FIG. 10, the two grooves 27 and 28 are both oblique, which means that if the pins 29 and 30 are located in these areas, both the first closing device 8 and the second closing device 24 are lifted in the direction of their longitudinal axis x. The closing movement of the two closing devices 8 and 24 takes place in the opposite direction of these rotary movements, i.e. from the configuration of FIG. 11 via the configuration of FIG. 10 to the configuration of FIG. 9.

Figure 12:
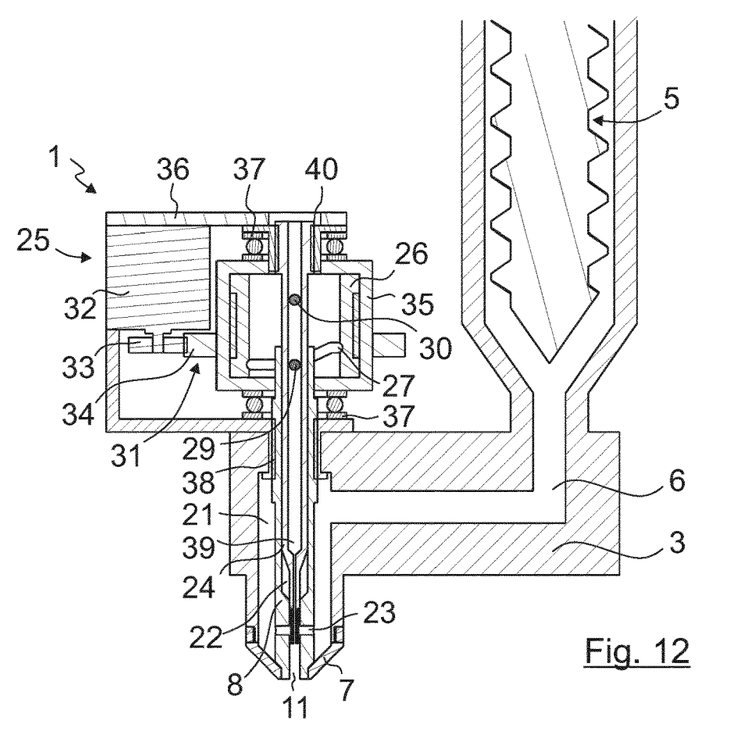
FIG. 12 shows a more detailed view of the apparatus according to the invention in the position shown in FIG. 9.

FIG. 12 shows a detailed view of an embodiment of the adjusting arrangement 25 for adjusting the two closing devices 8 and 24 of the apparatus 1. It can be seen that the control sleeve 26 can be rotated by means of a drive device 32 which is operatively connected to the control sleeve 26 via a transmission arrangement 31. In the present case, the transmission arrangement 31 is designed as a gear drive, but a belt drive or another suitable drive may also be provided. A direct drive through the drive device 32 is also conceivable. The drive device 32 may also be a pneumatic cylinder or a linear drive with a suitable transmission ratio.

The drive device 32 may be designed as an electric motor, for example. In the present case, the drive device 32 drives a gear 33, which meshes with another gear 34. The gear 34 in turn drives a housing 35 arranged inside it, which is firmly connected to the control sleeve 26. In this way, the control sleeve 26 can be rotated about its longitudinal axis by means of the drive device 32. The housing 35 serves to protect the control sleeve 26 with the grooves 27 and 28 as well as the pins 29 and 30 engaging in the grooves 27 and 28 of the control sleeve 26. The housing 35 is rotatably mounted relative to another housing 36 of the adjusting arrangement 25 by means of two bearing devices 37.

In order to ensure the movement of the first closing device 8 in its longitudinal direction x, i.e. in the vertical direction of the apparatus 1 shown in the figures, and to prevent rotation of the latter, the first closing device 8 is held in a non-rotatable manner. In the present case the first closing device 8 is held to the housing 3 of the apparatus 1. The second closing device 24 is rotationally mounted on the housing 36 by a guide bearing 40. In the present case, the closing device 8 is held in a non-rotatable manner by means of the sleeve 38, whose outside is firmly connected to the housings 3 and/or 36 and whose inside has a non-circular cross-section which corresponds to the outer cross-section of the first closing device 8 in this area. For example, the sleeve 38 may have teeth, a polygon or the like on its inside, which ensures that the first closing device 8 is held in place or held in a non-rotatable manner. However, it would also be possible to mount the second closing device 24 in a non-rotating manner on the housing 36 by means of a corresponding sleeve 38. Furthermore, the first closing device 8 of a construction similar to the guide bearing 40 could also be rotationally mounted on the housings 3 and/or 36. This could require additional changes in the area of the two discharge openings 7 and 11.

In contrast to the embodiment example of the apparatus 1 shown in FIGS. 9 to 11, the embodiment example of the apparatus 1 according to FIG. 12 has a through hole bore 39 in the second closing device 24 through which the additional material 10 not shown can be passed. The bore 39 thus corresponds in principle to the bore 9 of the embodiment of the apparatus 1 as shown in FIGS. 1 to 6. The additional material 10, which may have passed through the bore 39, emerges in the area of the second discharge opening 11 and can be enveloped by the deformable material 4 discharged through the second discharge opening 11. However, it is also possible to envelop the additional material 10 with the deformable material 4 discharged through the first discharge opening 7.

Figure 13:
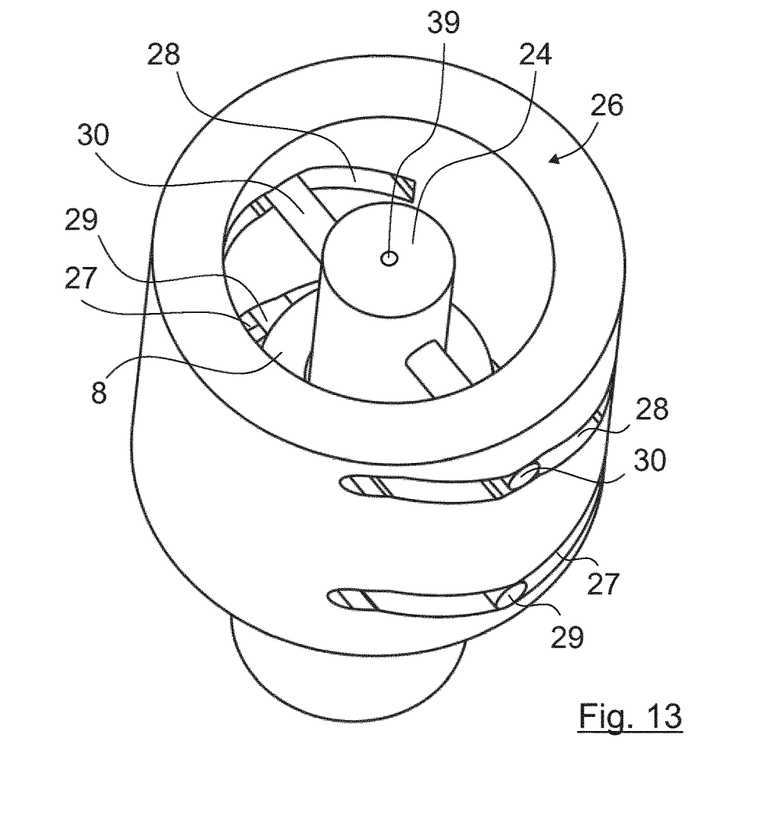
FIG. 13 shows a perspective view of a part of the apparatus of the invention as shown in FIGS. 9 to 12.

FIG. 13 shows the control sleeve 26 with the two grooves 27 and 28 and the pins 29 and 30 engaging in these grooves in a perspective view. In the present case, two grooves 27 and 28 and two pins 29 and 30 are provided, but other numbers are also conceivable, such as three grooves 27 and 28 and three pins 29 and 30. In contrast to the embodiment shown in FIG. 13, the grooves 27 and 28 can be connected continuously along the rotation direction of the control sleeve 26. For example, the groove 27 may be a continuously closed guide that makes it possible to select any position of the closing device 8 by rotating the control sleeve 26 in one direction. This minimizes the control effort and reduces the pitch of the grooves 27 and 28.

Contrary to the above description, an embodiment is also conceivable in which the control sleeve 26 is fixed and the closing devices 8 and 24 are rotated. These would then be positively guided in a similar way as described above by means of the pins 29 and 30 engaging in the grooves 27 and 28 of the control sleeve 26, whereby the same or a similar movement of the closing devices 8 and 24 as described above could be achieved. Furthermore, the coupled movement of the two closing devices 8 and 24 by means of the adjusting arrangement 25 or the control sleeve 26 is not absolutely necessary.

Figure 14:
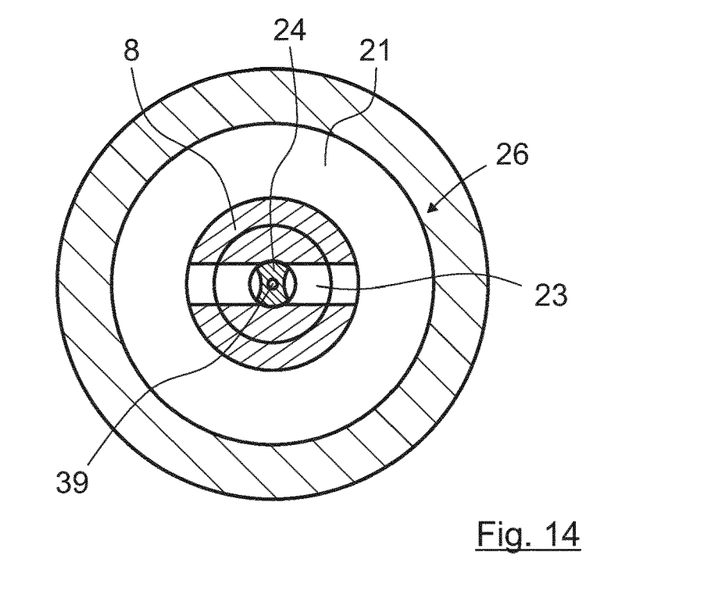
FIG. 14 shows a top view of an alternative embodiment of a part of the apparatus according to the invention shown in FIGS. 9 to 12.

FIG. 14 shows an alternative embodiment of the control sleeve 26. One of the two closing devices 8 or 24 can be controlled in a manner similar or identical to the movement according to FIGS. 9 to 13. In contrast, the other of the closing devices 8 or 24 is moved from its closed position to its open position shown in FIG. 14 by rotating it, thus opening the connecting bore 23. For this purpose, one of the two closing devices 8 or 24 to be rotated can be driven by the drive device 32 of the adjusting arrangement 25, if necessary without involving the control sleeve 26. At least in the area of the connecting bore 23, the driven one of the two closing devices 8 or 24 has a corresponding profile that allows the connecting bore 23 to be closed in one angular position and to be opened in another.

The apparatus 1 shown in FIGS. 9 to 14 and described above is in principle scalable as desired. Moreover, further discharge openings and their associated closing devices can be provided, for example within the second closing device 24. In addition, bores corresponding to the connecting bore 23 should then be provided in the closing devices.

The invention claimed is:

1. An apparatus (1) for producing three-dimensional objects (2) from a deformable material (4), comprising the following features:
    a housing (3) comprising a chamber (21) for receiving the deformable material (4);
    a feed device (5) that is or comprises an extruder for feeding the deformable material (4) into the chamber (21) of the housing (3);
    a first discharge opening (7) for discharging the deformable material (4) from the chamber (21) of the housing (3);
    a first closing device (8) for selectively closing and opening the first discharge opening (7), wherein the first closing device (8) comprises at least one connecting bore (23) that is connected to the chamber (21) of the housing (3);
    a second discharge opening (11), which has a smaller cross-section than the first discharge opening (7), for discharging the deformable material (4) from the chamber (21) of the housing (3); and
    a second closing device (24) for selectively closing and opening the at least one connecting bore (23), wherein the second closing device (24) comprises a longitudinal bore (39) that is divided in a longitudinal direction;
    wherein the feed device (5) and the first discharge opening (7) are not coaxial.

2. The device according to claim 1, characterized in that the second closing device (24) is located within a cavity (22) of the first closing device (8).

3. The device according to claim 1, characterized in that the first closing device (8) is adjustable in its longitudinal direction (x) to selectively close and open the first discharge opening (7) by means of an adjusting arrangement (25).

4. The device according to claim 1, characterized in that the second closing device (24) is adjustable in its longitudinal direction (x) to selectively close and open the at least one connecting bore (23) by means of an adjusting arrangement (25).

5. The device according to claim 1, characterized in that the second closing device (24) is rotatable about its longitudinal axis to selectively close and open the at least one connecting bore (23) by means of an adjusting arrangement (25).

6. The device according to claim 3, characterized in that the adjusting arrangement (25) comprises a control sleeve (26) with at least one groove (27,28) in which at least one pin (29,30) connected to one of the first closing device (8) or the second closing device (24) engages, the control sleeve (26) and the at least one said first closing device (8) or said second closing device (24) being rotatable relative to one another.

7. The device according to claim 6, characterized in that the control sleeve (26) and/or the at least one said first closing device (8) or said second closing device (24) can be rotated by means of a drive device (32) which is operatively connected to the control sleeve (26) and/or to the at least one said first closing device (8) or said second closing device (24) via a transmission arrangement (31).

8. The device according to claim 7, characterized in that the transmission arrangement (31) is provided as a gear drive or belt drive.

9. The device according to claim 1, characterized in that at least one of the first closing device (8) or the second closing device (24) is held in a non-rotatable manner.

10. The device according to claim 2, characterized in that the first closing device (8) is adjustable in its longitudinal direction (x) to selectively close and open the first discharge opening (7) by means of an adjusting arrangement (25).

11. The device according to claim 2, characterized in that the second closing device (24) is adjustable in its longitudinal direction (x) to selectively close and open the at least one connecting bore (23) by means of an adjusting arrangement (25).

12. The device according to claim 3, characterized in that the second closing device (24) is adjustable in its longitudinal direction (x) to selectively close and open the at least one connecting bore (23) by means of an adjusting arrangement (25).

13. The device according to claim 2, characterized in that the second closing device (24) is rotatable about its longitudinal axis to selectively close and open the at least one connecting bore (23) by means of an adjusting arrangement (25).

14. The device according to claim 3, characterized in that the second closing device (24) is rotatable about its longitudinal axis to selectively close and open the at least one connecting bore (23) by means of an adjusting arrangement (25).

15. The device according to claim 4, characterized in that the adjusting arrangement (25) comprises a control sleeve (26) with at least one groove (27,28) in which at least one pin (29,30) connected to one of the first closing device (8) or the second closing device (24) engages, the control sleeve (26) and the at least one said first closing device (8) or said second closing device (24) being rotatable relative to one another.

16. The device according to claim 5, characterized in that the adjusting arrangement (25) comprises a control sleeve (26) with at least one groove (27,28) in which at least one pin (29,30) connected to one of the first closing device (8) or the second closing device (24) engages, the control sleeve (26) and the at least one said first closing device (8) or said second closing device (24) being rotatable relative to one another.

* * * * *